United States Patent
Whitt et al.

(10) Patent No.: US 8,296,310 B1
(45) Date of Patent: Oct. 23, 2012

(54) UNIFIED MANAGEMENT OF TIME RELATED INFORMATION

(75) Inventors: Carlos Whitt, Mountain View, CA (US); Ajit Varma, Mountain View, CA (US); Natsha Carlitz, Menlo Park, CA (US); Tal Dayan, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/299,047

(22) Filed: Nov. 17, 2011

Related U.S. Application Data

(63) Continuation of application No. 11/454,242, filed on Jun. 17, 2006, now Pat. No. 8,078,626.

(51) Int. Cl.
*G06F 7/00* (2006.01)
(52) U.S. Cl. ........................................ 707/758
(58) Field of Classification Search ............... None
See application file for complete search history.

(56) References Cited

U.S. PATENT DOCUMENTS

| | | | |
|---|---|---|---|
| 6,985,837 B2 | 1/2006 | Moon et al. | |
| 7,092,956 B2 | 8/2006 | Ruediger | |
| 7,287,019 B2 | 10/2007 | Kapoor et al. | |
| 2004/0133583 A1 | 7/2004 | Tingey | |
| 2005/0033616 A1 | 2/2005 | Vavul et al. | |
| 2005/0058263 A1* | 3/2005 | Frazier | 379/88.13 |
| 2005/0060174 A1 | 3/2005 | Heyward et al. | |
| 2006/0206400 A1 | 9/2006 | Usul | |

OTHER PUBLICATIONS

Umble, E.J., et al., "Enterprise resource planning: Implementation procedures and critical success factors," *European Journal of Operational Research*, 2003, pp. 241-257.

* cited by examiner

*Primary Examiner* — Truong Vo
(74) *Attorney, Agent, or Firm* — Sterne, Kessler, Goldstein & Fox PLLC

(57) ABSTRACT

Unified management of time related information presents a user with a single interface by which the data in different ERP systems can be browsed and modified. Each of the ERP systems can contain data specific to a data group such as the address data group in a human resources ERP system, sales data in a sales ERP system, and project data in a project planning ERP system. A view management module obtains records from the ERP systems. The view manager also obtains journaling information that can be kept in the ERP systems or kept separately. The view manager creates a history view and data group views that can be presented to a user. The user interacts with the presentation to sort, browse, analyze, and edit the view and data. Data changed in a data group view can be forwarded to produce changes in the ERP and journaling systems.

17 Claims, 8 Drawing Sheets

| Address Data group 601 |||| 
|---|---|---|---|
| Id | Address | Entered | Valid |
| 1 | SM Address | 12/31/2000 | 12/31/2000 |
| 2 | KB Address | 12/31/2000 | 12/31/2000 |
| 3 | KM Address | 12/31/2000 | 12/31/2000 |
| 4 | EC Address | 12/31/2000 | 12/31/2000 |

*Fig. 6*

| Name Data group 701 |||||
|---|---|---|---|---|
| Id | First | Last | Entered | Valid |
| 1 | Stanley | Marsh | 12/31/2000 | 12/31/2000 |
| 2 | Kyle | Broflovski | 12/31/2000 | 12/31/2000 |
| 3 | Kenneth | McCormic | 12/31/2000 | 12/31/2000 |
| 4 | Eric | Cartman | 12/31/2000 | 12/31/2000 |
| 5 | Leopold | Stotch | 12/31/2000 | 12/31/2000 |

*Fig. 7*

| Salary Data group 801 ||||
|---|---|---|---|
| Id | Salary | Entered | Valid |
| 2 | 156 | 8/1/2002 | 8/15/2002 |
| 5 | 156 | 8/1/2002 | 8/15/2002 |
| 1 | 156 | 8/1/2002 | 8/15/2002 |
| 4 | 104 | 8/1/2002 | 8/15/2002 |
| 3 | 0 | 8/1/2002 | 8/15/2002 |
| 4 | 156 | 5/1/2003 | 5/15/2003 |
| 4 | 2,540,000 | 7/12/2003 | 7/12/2003 |
| 4 | 156 | 8/1/2003 | 8/20/2003 |
| 2 | 208 | 8/1/2003 | 8/15/2003 |

*Fig. 8*

| Position Data group 901 ||||
|---|---|---|---|
| Id | Position | Entered | Valid |
| 2 | 3rd Grader | 8/1/2002 | 8/15/2002 |
| 5 | 3rd Grader | 8/1/2002 | 8/15/2002 |
| 1 | 3rd Grader | 8/1/2002 | 8/15/2002 |
| 4 | 3rd Grader | 8/1/2002 | 8/15/2002 |
| 3 | 3rd Grader | 8/1/2002 | 8/15/2002 |
| 4 | CEO | 7/12/2003 | 7/12/2003 |
| 4 | 4th Grader | 8/1/2003 | 8/20/2003 |
| 2 | 4th Grader | 8/1/2003 | 8/15/2003 |
| 1 | 4th Grader | 8/1/2003 | 8/15/2003 |
| 5 | 4th Grader | 8/1/2003 | 8/15/2003 |
| 3 | 4th Grader | 8/1/2003 | 8/15/2003 |

*Fig. 9*

UNIFIED MANAGEMENT OF TIME RELATED INFORMATION

This application is a continuation of application Ser. No. 11/454,242 filed Jun. 17, 2006, which is incorporated herein by reference in its entirety.

TECHNICAL FIELD

Embodiments relate to the fields of data collection, data storage and data analysis. Embodiments also relate to the fields of graphical user interfaces and data presentation.

BACKGROUND

Enterprise resource planning (ERP) systems, management information systems (MIS) and business information systems (BIS) are used to gather, store and analyze information. The information is often associated with time and thus called time related information. The time associated with the time the transaction was entered to the system (called Transaction Time or Journal Time) or the time period in which this information is valid (Valid Time or Business Time). For example, the system may have information that the user Frodo Baggins submitted a transaction on Jan. 2, 2006 with the transaction specifying that from Feb. 1, 2006 to Mar. 5, 2006, his main phone number will +123456 since he will be on a trip. As such, Jan. 2, 2006 is the transaction time while the period from Feb. 1, 2006 to Mar. 5, 2006 is the valid time.

Data that is associated with time is often call 'time related' or 'temporal'. More specifically, data that is associated with two timelines is called 'bitemporal' (a special case of 'temporal'). In the above example, the data is time related because it is associated with time. More specifically, the data is bitemporal because it is associated with two timelines. The Transaction time is the time the transaction was recorded by the system and the Valid time is the time in which the data will be valid.

Referring again to the example of the bitemporal information above, a user can issue time related queries that can be simple such as 'what will be the main phone number of user Frodo Baggins on Feb. 1, 2006' or complex such as 'as of Dec. 15, 2004, what was the phone number of user Frodo Baggins on Mar. 1, 2006', It is clear that dealing with bitemporal data is often a source of confusion for many users and a better way to present and manage the data is required.

When an information system associates time with data, this is typically done on a group of values (or 'fields'). For example, if an information system contains the first, middle and last name of a person, the related time is associated with the three values as a single group rather than having related time for each of the three values. In this disclosure, we refer to a set of data values that are associated with a single time information as a Data Group. For example, in an ERP system, person name information (first name, middle name, and last name) may be one data group while the person home address (street, city, zip, country) can be a second data group, each is associated separately with transaction and valid time information.

The time related data can be used for managing resources or for analyzing the past or forecasting the future. The data is often stored in different systems. For example, a human resources (HR) system can contain data that was valid in the past, is currently valid, or is expected to become valid regarding a person's location, work times, and pay. A project management (PM) system can contain information regarding project tasking, and progress. Businesses often have many different ERP, MIS, an BIS systems with each system used to manage a portion of the business. For simplicity, all of these systems shall be collectively referred to as ERP systems.

Systems and methods for creating, storing, editing, deleting and otherwise accessing time related information in an ERP system are commonly used in the course of doing business. Users can use the methods to browse and analyze the data in the ERP system. A user can analyze the data in two separate data groups by concurrently using the systems and methods associated with each of the two separate systems. For example, a person can place a display presenting data from the first data group (e.g. Person Title) adjacent to a display presenting data from the second data group (e.g. Person Salary).

Systems and methods that ease the concurrent browsing and access of separate data groups and ERP systems are needed so that users can more efficiently discover trends and correlations in the data.

BRIEF SUMMARY

The following summary is provided to facilitate an understanding of some of The innovative features unique to the embodiments and is not intended to be a full description. A full appreciation of the various aspects of the embodiments can be gained by taking the entire specification, claims, drawings, and abstract as a whole.

It is therefore an aspect of the embodiments to provide at least one database that maintains entity data for entities. The entity data is associated with one of more data groups. Each data group is associated with time related information. For example, home address records can be associated with the home address data group which is associated with its time related information and name records can be associated with the name data group which is associated with its time related information.

The different data groups can correspond to different Enterprise Resource Planning (ERP) systems or to the same system. Each ERP system can have entity records. The record logs can reside within the ERP systems or can be stored within separate databases. Alternative embodiments can contain middleware modules. A middleware module can be used to standardize access to the various ERP systems because different ERP systems can have different access and control methods. For example, one ERP system can be based in a relational database having an SQL interface. Another ERP system can be web based having an interface based on HTML and cookies.

A single database can store the data for more than one data group. For example, a human resources database or ERP system can contain datagroup data for names, addresses, positions, and salaries. A research ERP system can contain datagroup data for employee publications.

It is another aspect of the embodiments to provide a view management module. The view management module obtains entity data from a database. The view management module also creates and controls a history view and zero or more data group views. The history view has historical panels. An entity record and some data from a record journal can be presented in each historic panel. The view management module can be a program running on a computer. The view management module can also be downloaded from a server and run within a web browser.

In addition to historic panels, a history view can have controls. A sorting control can be used to cause the historical panels to appear in a desired order such as sorted by entry date, sorted by data group, or sorted by valid date. Advancing through the historical records can reveal how data changes. For example, a unified time line is created when the historical panels are sorted by valid date because advancing through the historical panels reveals how the data changes as a function of time. As such, time based correlations can be observed. A human resources system with a position datagroup and a salary datagroup can reveal any correlations between responsibility and income or tenure and income.

A historical panel can be used to cause a data group view to be presented. For example, a historical panel associated with the address data group can be used to cause an address data group view to be presented.

Another example can illustrate interactions between the history view and the data group views. The display can present the history view, a Position data group view, and a Salary data group view. The user choose to see the history view sorted by data. As such, the user can observe correlations between a person's title and that person salary.

A template can be used to control the appearance of the history view and data group views. For example, a template can specify a presentation having the history panel and two data group views. The template can be used to quickly create a presentation without requiring manual configuration each time the presentation is desired.

Data group views can contain controls as well as entity data. The controls can be used to edit the entity data or to browse through the entity data. Entity data can be browsed in a sort order, such as the sort orders discussed above. A control can also be used to control how a particular data group is displayed such as which fields to display and in which order. A data group view can also be tabbed. Tabbed views a familiar to those experience in web browsing.

It is also an aspect of the embodiments to provide a presentation device that presents the history view and data group views to a user. The presentation device can be a computer monitor. A computer can run the view management module and present the various views to a user. A browser based view management module can present data within browser windows.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

FIG. 6 illustrates an example of an address datagroup in accordance with aspects of certain embodiments;

FIG. 7 illustrates an example of a name datagroup in accordance with aspects of certain embodiments;

FIG. 8 illustrates an example of a salary datagroup in accordance with aspects of certain embodiments;

FIG. 9 illustrates an example of a position datagroup in accordance with aspects of certain embodiments;

DETAILED DESCRIPTION

The particular values and configurations discussed in these non-limiting examples can be varied and are cited merely to illustrate embodiments and are not intended to limit the scope of the invention.

OVERVIEW

Unified management of time related information presents a user with a single interface by which the data in different data groups or ERP systems can be browsed and modified using a unified time line. Each of the ERP systems can contain data specific to a data group such as the address data group in a human resources ERP system, sales data in a sales ERP system, and project data in a project planning ERP system. A view management module obtains records from the ERP systems. The view manager also obtains journaling information that can be kept in the ERP systems or kept separately. The view manager creates a history view and data group views that can be presented to a user. The user interacts with the presentation to sort, browse, analyze, and edit the view and data. Data changed in a data group view can be forwarded to produce changes in the ERP and journaling systems.

Architectural Overview

Figure 1:
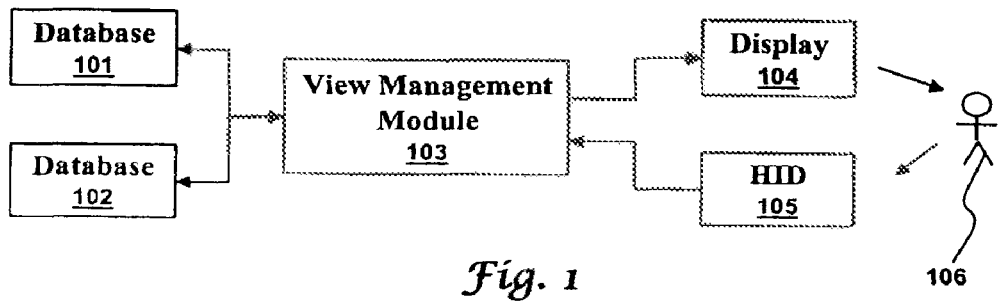
FIG. 1 illustrates a high level block diagram of a system for the unified management of time related information in accordance with aspects of the embodiments.

FIG. 1 illustrates a high level block diagram of a system for the unified management of time related information in accordance with aspects of the embodiments. A view management module 103 obtains entity records and record journals from a first database 101 and a second database 102. The databases can store data for different ERP systems. The view management module 103 creates a history view and some data views that are presented on a display 104 to a user 106. The user 106 can edit records presented in the views and manipulate controls presented with the views by way of a human interface device (HID) 105. Edited record data can be sent from the view management module 103 back into a database 101, 102. Each database 101, 102 keeps record journals so that a history is maintained of who changed what data and when.

Figure 2:
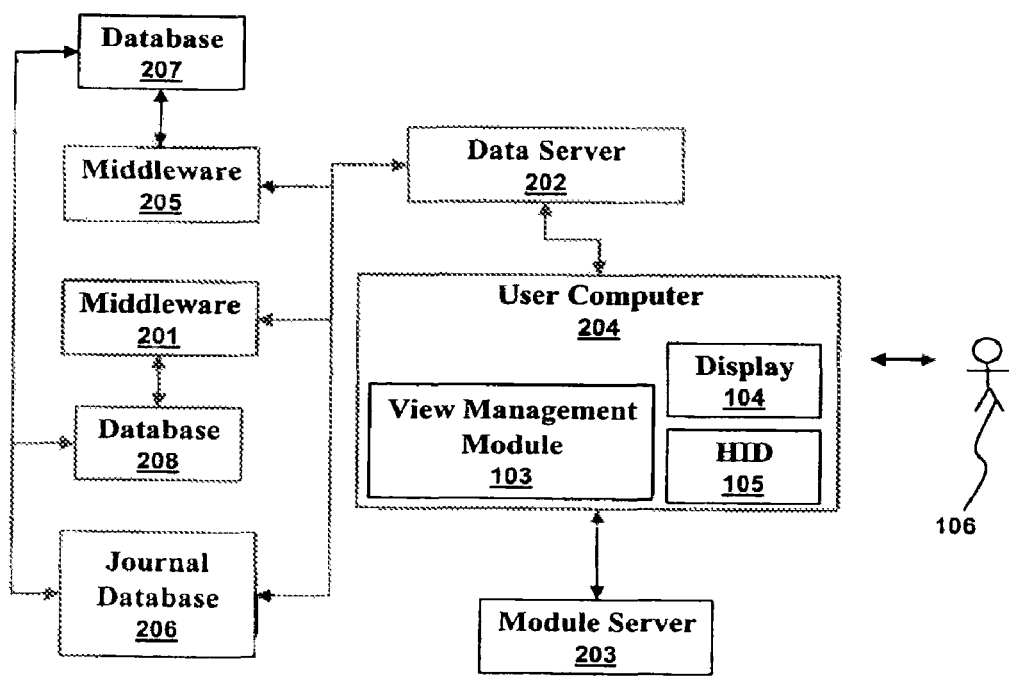
FIG. 2 illustrates a high level block diagram of another system for the unified management of time related information in accordance with aspects of the embodiments.

FIG. 2 illustrates a high level block diagram of another system for the unified management of time related information in accordance with aspects of the embodiments. The user 106 uses a computer 204 for viewing and manipulating data. The computer 204 has a display 104 for presenting data and an HID 105 for receiving input from the user 106. The computer 106 can download the view management module 103 from a module server 203. The module server can be a web server and the view management module can consist of scripts or executable code in a web page. For example, the user 106 selects an icon presented on the display 104 causing the computer 204 to request a web page from the module server 203. The module server 203 responds by returning a web page containing the view management module 103. After receiving the view management module 103, the computer 106 begins running it.

The view management module 103 accesses a data server 202 to obtain entity records and record journals. The entity records are stored in a first database 207 and a second database 208. Neither database, however, can be directly contacted. Furthermore, unlike the databases illustrated in FIG. 1, the databases 207, 208 do not keep record journals. A journal database 206 does keep the record journal. The data server 202 can, however, access a first middleware 205 that can access the first database 207 and thereby give the data server 202 access to the entity records stored in the first database 207. The data server 202 can similarly access the second database 208 via a second middleware 201. The data server 202 can directly access the journal database 206 to obtain record journals.

Figure 3:
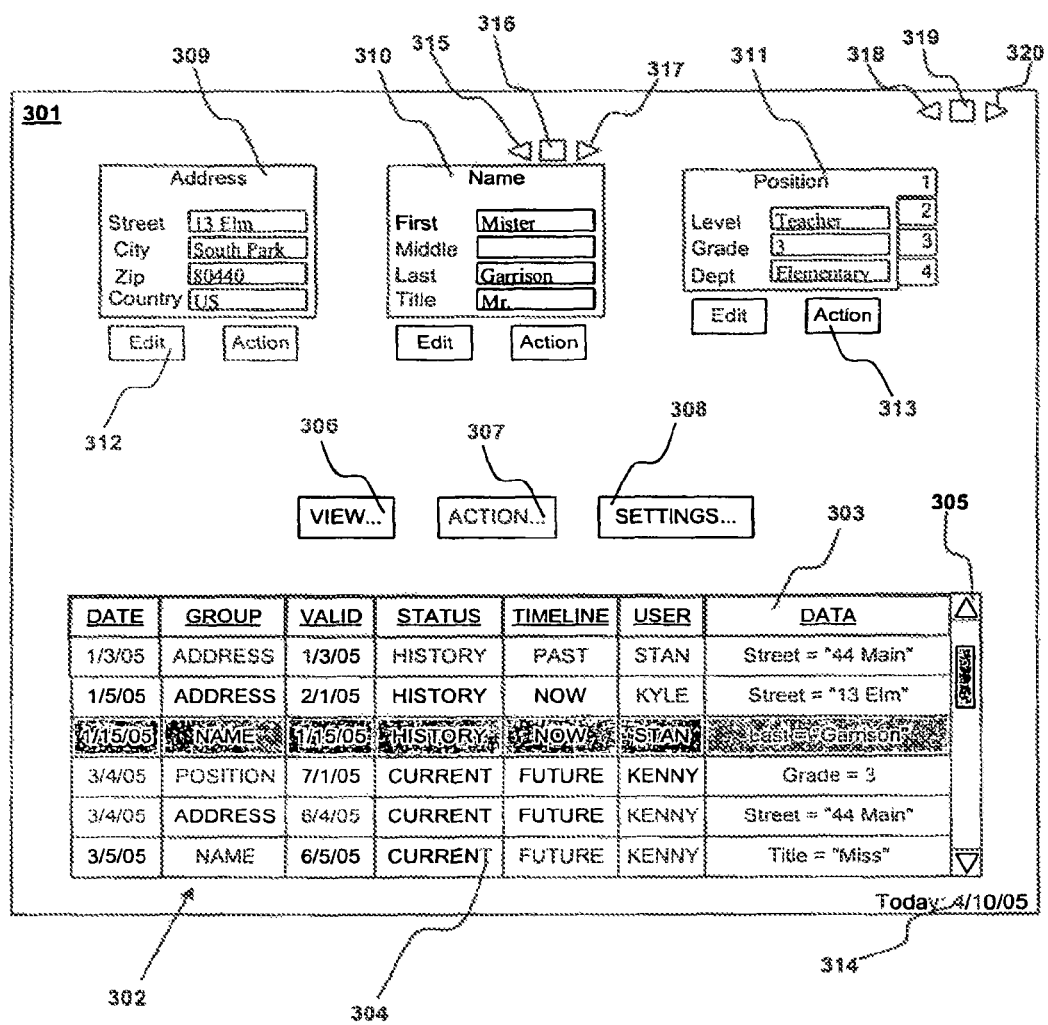
FIG. 3 illustrates a display presenting a history view and three data group views in accordance with aspects of the embodiments.

FIG. 3 illustrates a display 301 presenting a history view 302 and three data group views 309, 310, 311 in accordance with aspects of the embodiments. A history view 302 can be presented as a table having a title bar 303 and table data 304. Each table row is a historical panel and presents data associated with an entity record. The historical panel dated Jan. 15, 2005 is highlighted indicating that the data displayed in the data group views was current on Jan. 15, 2005. The data, as indicated by the "Name" data group view 310, is presenting the changing details in the life of Mr. Garrison. According to the Address data group view 309 and Position data group view 311, as of Jan. 15, 2005, Mr. Garrison lived on 13 μm Street and taught 3rd grade. A user can step backward in time by clicking the global backward button 318, forward in time by clicking the global forward button 320, or to the present, Apr. 10, 2005 314, by clicking the global now button 319. The global buttons cause all the views to change.

An entity record can change over time. At first, an entity record is created. Later, it can be edited. A record journal tracks an entity record's changes over time. As such, the entity record contains the most recent data while the record journal can be used to recall previous versions of an entity record.

Returning to the history view, the first historical panel has a date value of "Jan. 3, 2005" indicating the record was created or modified on Jan. 3, 2005. The data group is "ADDRESS". The record became valid on Jan. 3, 2005 indicating that the address was a current address on the date entered. The "STATUS" is history indicating that the data in the historical panel is not the most recent data associated with the entity record. The "TIMELINE" is past indicating that it is a past address as of the present day Apr. 10, 2005 314. The "USER" is Stan indicating that on Jan. 3, 2005 Stan changed the "DATA" by selecting the edit button 312 and setting the street value equal to "44 Main".

On Jan. 5, 2005, Kyle changed Mr. Garrison's street address to "13 Elm", The new address, however, was not valid until Feb. 1, 2005 because that was Mr. Garrison's moving day. Similarly, in early March, Kenny made three changes to Mr. Garrison's records. The historical panels indicate the information is current because it is the most recent information. The timeline, however, indicates the changes will become valid in the future.

The history view can also have controls such as a scroll bar 305, view button 306, action button 307, and settings button 308. The title bar is shown having 7 column headings. The column headings themselves are underlined to indicate that they are also controls. Clicking on the "DATE" column heading can cause the history view to become sorted by date. In fact, the history panel is sorted in order of ascending date. Clicking on "DATE" again can cause the history panel to be sorted in order of descending date. Each column heading is also a control that can effect sorting order. For example, "VALID" can be selected to cause sorting by valid dates.

The history view 302 view control 306 allows the user to configure the history view. Configuring the history view can include changing fonts, size, the order of the columns or other details. This is in contrast to the settings control 308 that a user can use to customize the entire display 301. For example, a user can choose to see the history view and one data group view. The action control 307 can be used for editing history view data such as deleting rows or changing a "DATE" field or other field.

Data group views can also have controls. The edit control 312 is discussed above. The action control 313 can be used for more general control of the data group view such as selecting fonts, colors, and what other controls to show. For example, the Action button can be used to select the display of tabbed views or data group time browser buttons. Data group time browser buttons, such as the forward 317, backward 315, and now 316 buttons, can be used to make the data group view display information corresponding to times in the future, past, or present. Unlike the global buttons 318, 319, 320, the data group time browser buttons 315, 316, 317 are associated, and control, only a single data group view.

The Position data group view is a tabbed view. The first tab is displayed. The other tabs can be selected to access other information. For example, the second tab can display name data group information while the third tab can display position data group information for a different point in time.

Other controls can also be used to browse through the data group views. Instead of the forward button 317 and a backward button 315, a slider can be used. Sliders are commonly used in graphical user interviews to select a value from within a range. For example, the volume control for speakers is often presented as a slider. Sliding the control in one direction reduces sound volume while sliding it in the other increases sound volume. A similar slider can be used to select a time along a unified time line. Selecting a time can cause the data that was valid at that time to be presented in data group views.

FIG. 6 illustrates an example of an address data group 601 in accordance with aspects of certain embodiments. Each Id is associated with a person. The data for each person was entered on Dec. 31, 2000 and was valid on that same date.

FIG. 7 illustrates an example of a name data group 701 in accordance with aspects of certain embodiments. The data for each person was entered on Dec. 31, 2000 and was valid on that same date. The information in the address data group 601 and in the name data group can be associated by the Id. For example, Id 1 refers to a person currently named Stanley Marsh who lives at SM Address.

FIG. 8 illustrates an example of a salary data group 801 in accordance with aspects of certain embodiments. Many entries were made on Aug. 1, 2002 that became valid on Aug. 15, 2002. Using the Id, it can be seen the Stanley Marsh was receiving a salary of $156 per year on and after Aug. 15, 2002. The person referred to by Id 2 received a raise on Aug. 1, 2003 that became valid on Aug. 15, 2003. The person referred to by Id 4 has a strange salary history.

FIG. 9 illustrates an example of a position data group 901 in accordance with aspects of certain embodiments. It can be seen that five people entered the third grade on Aug. 15, 2002 and then the fourth grade on Aug. 15, 2003. In the summer of 2003, one person was, briefly, the CEO.

Figure 10:
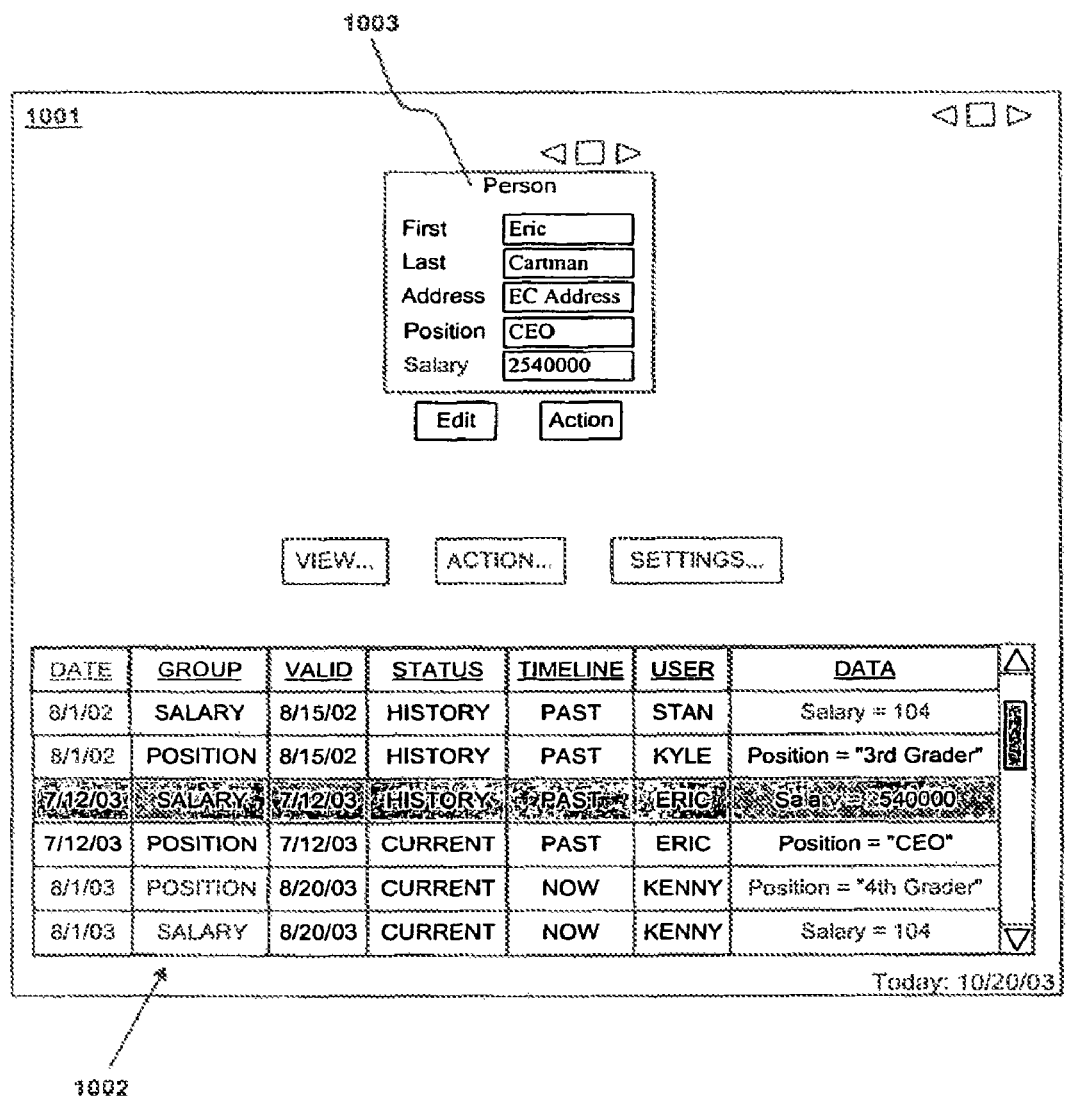
FIG. 10 illustrates a display presenting a history view and a virtual data group view in accordance with aspects of some embodiments.

FIG. 10 illustrates a display 1001 presenting a history view 1002 and a data group view 1003 in accordance with aspects of some embodiments. The history view is similar to that of FIG. 3 with the exception that the history view for the person associated with Id 4 is presented. The data corresponds to that in the data groups of FIGS. 6-9. The data group view 1003 presents information for the "person" data group. The "person" data group is a virtual data group because it is not a real data group but is derived from real data groups. "Person" is derived by combining "Name", "Address", "Position", and "Salary", In more complicated embodiments, a virtual data group can be derived by combining parts of actual data groups.

To a user, a virtual data group appears to be the same as an actual data group. As such, it can be edited. When a user saves a virtual data group entry, however, the data is stored in the appropriate actual data group. For example, on Aug. 1, 2003 Kenny edited Eric Cartman's data by using the "person" data group view. Kenny set position to "4th grader", salary to 104, chose a valid date and then saved the entry. The information Kenny entered into the "person" data group view was then stored into the position data group and the salary data group.

High Level Process Flow

Figure 4:
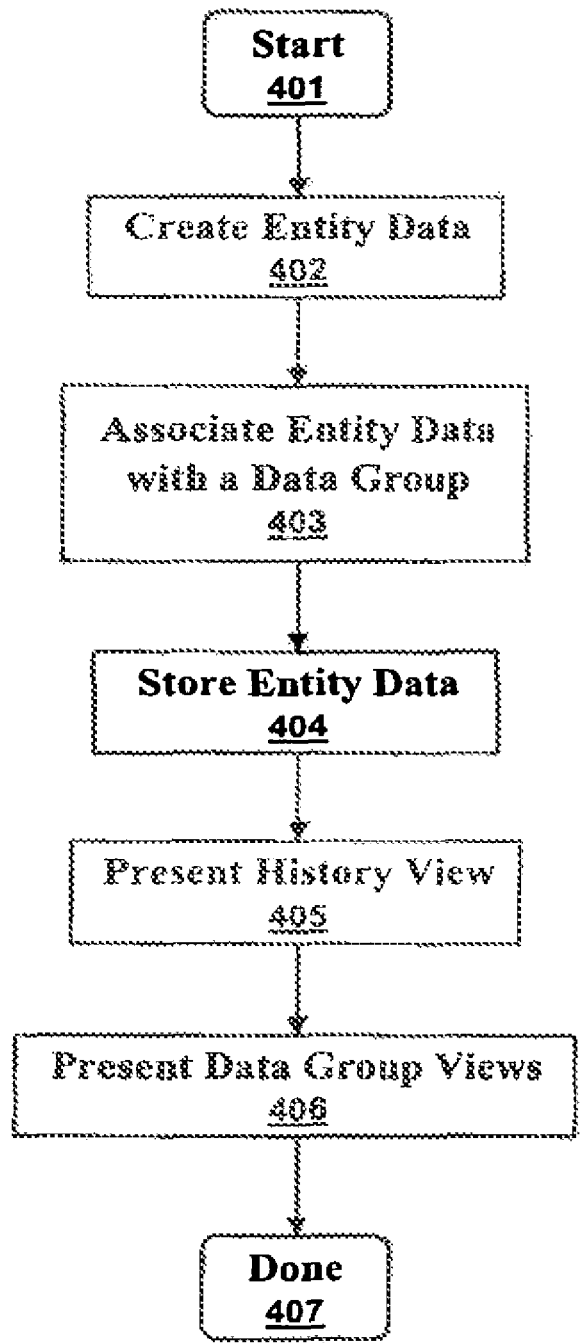
FIG. 4 illustrates a high level flow diagram of creating and displaying entity data in accordance with aspects of the embodiments.

FIG. 4 illustrates a high level flow diagram of creating and displaying entity data in accordance with aspects of the embodiments. After the start 401, entity data is created 402 and associated with a data group 403. The data is stored 404. For example, entering a new address into a human resources (HR) ERP system creates data, associates it with an address data group, and stores it in the ERP database. A history view is presented 405 showing the data and journaling information. Data group views are displayed 406 based on the display settings chosen by the user. The user can browse and edit, but doesn't have to, before the process is done 407.

Figure 5:
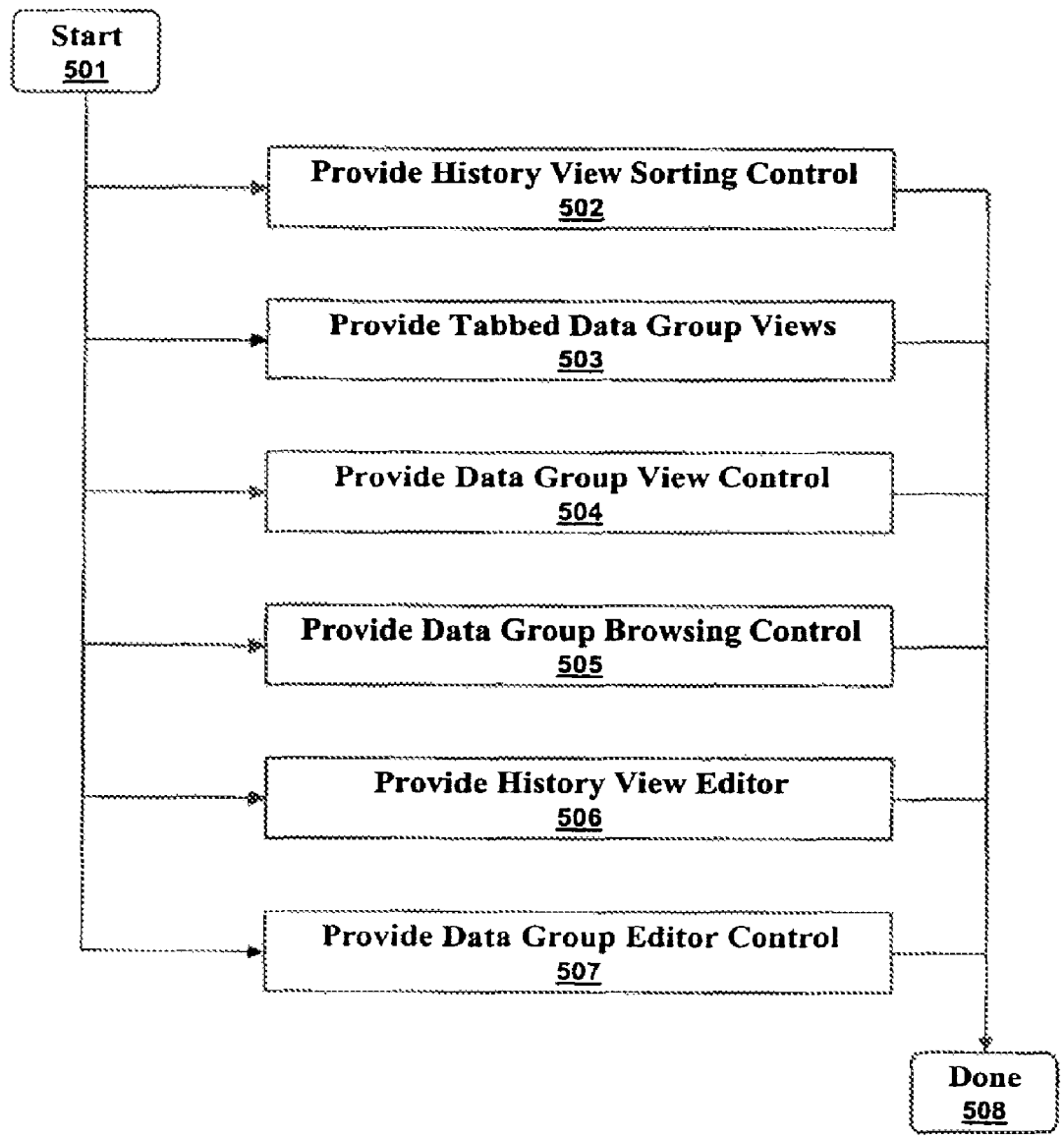
FIG. 5 illustrates a high level flow diagram of presenting controls in accordance with aspects of certain embodiments.

FIG. 5 illustrates a high level flow diagram of presenting controls in accordance with aspects of certain embodiments. After the start 501 the user can be provided with an assortment of controls. The user can be provided with a history view sorting control 502 such as the "DATE" and "VALID" controls in the history view title bar.

The user can be provided with a tabbed data group view 503 such as the position data group view 311. The user can be provided with a data group view control 504. The user can be provided with a data group browsing control 505 such as the data group time browser buttons 315, 316, and 317. The user can be provided with a history view editor 506 such as the view button 306. The user can be provided with a data group editor 507 such as that accessed by clicking the edit button 312. Note that the editor can appear exactly as a data group view with the only exception being that the display fields become edit fields. For example "13 Elm" can be displayed in a display field in the address data group view whereas clicking the edit button 312 can cause "13 Elm" to become editable.

Figure 11:
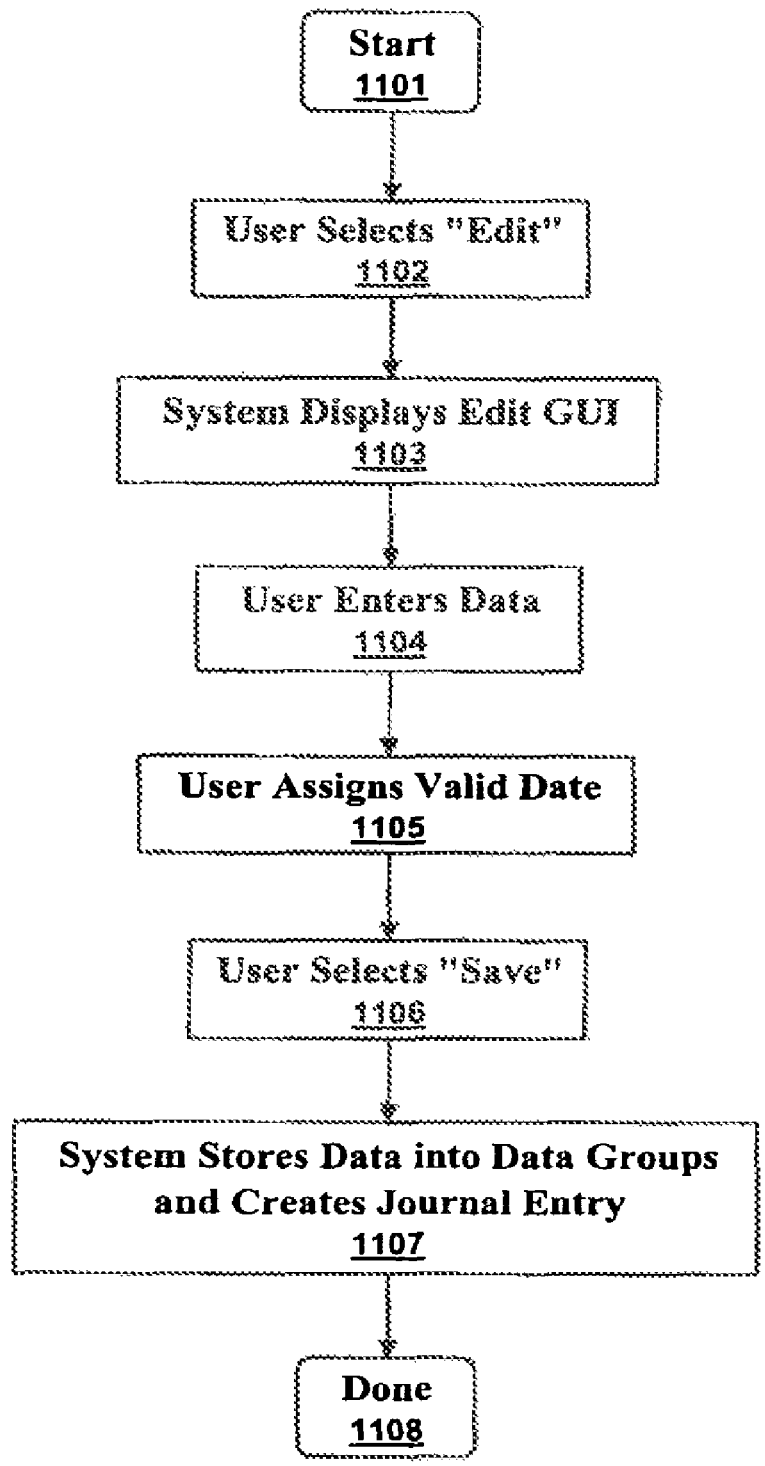
FIG. 11 illustrates a high level flow diagram of entering and storing data in accordance with aspects of the embodiments.

FIG. 11 illustrates a high level flow diagram of entering and storing data in accordance with aspects of the embodiments. After the start 1101, a user selects "Edit" and the system displays an edit graphical user interface (GUI) 1103. An edit GUI can appear the same as a data group view but can also contain a field by which a valid date can be entered. The user enters the data 1104 into the GUI, assigns a valid date 1105. and saves the entry 1106. The system then stores the entry into data groups. If the user edited an actual data group, the entry is saved to a single data group while editing a virtual data group can result in the entry being saved to multiple data groups.

GENERAL

Embodiments can be implemented in the context of modules. In the computer programming arts, a module (e.g., a software module) can be implemented as a collection of routines, data structures, firmware and hardware that perform particular tasks or implement a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for managing time-related data with a unified timeline, comprising:
    (a) retrieving a first entity record from a first plurality of entity records such that the retrieved first entity record has a valid time period that includes a particular time, wherein respective entity records in the first plurality of entity records are of a first data type and have an associated valid time period;
    (b) retrieving a second entity record from a second plurality of entity records such that the retrieved second entity record has a valid time period that includes the particular time, wherein respective entity records in the second plurality of entity records are of a second data type and have an associated valid time period, the second data type being different from the first data type;
    (c) displaying a first data group view such that the first data group view includes data from the retrieved first entity record;
    (d) displaying a second data group view such that second data group view includes data from the retrieved second entity record;
    (e) receiving an input from a user to alter the particular time;
    in response to receipt of the input:
    (f) retrieving a third entity record from the first plurality of entity records such that the retrieved third entity record has a valid time period that includes the altered particular time;
    (g) retrieving a fourth entity record from the second plurality of entity records such that the retrieved fourth entity record has a valid time period that includes the altered particular time;
    (h) altering the first data group view to display data from the retrieved third entity record; and
    (i) altering the second data group view to display data from the retrieved fourth entity record.

2. The method of claim 1, wherein the receiving (e) comprises receiving an input indicating that the user has selected one of a forward time button to move the particular time forward in time and a backward time button to move the particular time backward in time.

3. The method of claim 1, wherein the receiving (e) comprises receiving an input indicating that the user altered a slider control to specify a value for the particular time.

4. The method of claim 1, further comprising:
(j) displaying a table including entity data from both the both the first and second plurality of entity records such that the table indicates whether the particular time is before, during, or after respective valid time periods associated with entity data displayed in the respective rows of the table.

5. The method of claim 1, further comprising:
(j) enabling the user to edit the third entity record using the first data group view; and
(k) enabling the user to edit the fourth entity record using the second data group view,
whereby the enabling of steps (j) and (k) enables the user to edit disparate entity data according to the unified timeline.

6. The method of claim 1, wherein the displaying (c) comprises displaying first data group view in a first font specified by the user and the displaying (d) comprises displaying data group view in a second font specified by the user.

7. The method of claim 1, wherein the displaying (c) comprises displaying first data group view in a first tab and the displaying (d) comprises displaying second data group view in a second tab different from the first tab.

8. The method of claim 1, further comprising:
(j) displaying a third data group view such that the third data group view includes data from both the retrieved first and second entity records.

9. A program storage device readable by a processor, tangibly embodying a program of instructions executable by the processor to perform method steps for managing time-related data with a unified timeline, said method steps comprising:
(a) retrieving a first entity record from a first plurality of entity records such that the retrieved first entity record has a valid time period that includes a particular time, wherein respective entity records in the first plurality of entity records are of a first data type and have an associated valid time period;
(b) retrieving a second entity record from a second plurality of entity records such that the retrieved second entity record has a valid time period that includes the particular time, wherein respective entity records in the second plurality of entity records are of a second data type and have an associated valid time period, the second data type being different from the first data type;
(c) displaying a first data group view such that the first data group view includes data from the retrieved first entity record;
(d) displaying a second data group view such that second data group view includes data from the retrieved second entity record;
(e) receiving an input from a user to alter the particular time;
in response to receipt of the input:
(f) retrieving a third entity record from the first plurality of entity records such that the retrieved third entity record has a valid time period that includes the altered particular time;

(g) retrieving a fourth entity record from the second plurality of entity records such that the retrieved fourth entity record has a valid time period that includes the altered particular time;
(h) altering the first data group view to display data from the retrieved third entity record; and
(i) altering the second data group view to display data from the retrieved fourth entity record.

10. The program storage device of claim 9, wherein the receiving (e) comprises receiving an input indicating that the user has selected one of a forward time button to move the particular time forward in time and a backward time button to more the particular time backward in time.

11. The program storage device of claim 9, wherein the receiving (e) comprises receiving an input indicating that the user altered a slider control to specify a value for the particular time.

12. The program storage device of claim 9, the method further comprising:
(j) displaying a table including entity data from both the both the first and second plurality of entity records such that the table indicates whether the particular time is before, during, or after respective valid time periods associated with entity data displayed in the respective rows of the table.

13. The program storage device of claim 9, the method further comprising:
(j) enabling the user to edit the third entity record using the first data group view; and
(k) enabling the user to edit the fourth entity record using the second data group view,
whereby the enabling of steps (j) and (k) enables the user to edit disparate entity data according to the unified timeline.

14. The program storage device of claim 9, wherein the displaying (c) comprises displaying first data group view in a first font specified by the user and the displaying (d) comprises displaying data group view in a second font specified by the user.

15. The program storage device of claim 9, wherein the displaying (c) comprises displaying first data group view in a first tab and the displaying (d) comprises displaying second data group view in a second tab different from the first tab.

16. The program storage device of claim 9, the method further comprising:
(j) displaying a third data group view such that the third data group view includes data from both the retrieved first and second entity records.

17. A system for managing time-related data with a unified timeline, comprising:
a computer device;
a database that stores a first plurality of entity records and a second plurality of entity records, wherein respective entity records in the first plurality of entity records are of a first data type and have an associated valid time period, and respective entity records in the second plurality of entity records are of a second data type and have an associated valid time period, the second data type being different from the first data type;
a server, implemented on the computer device, that provides, to a client, a view management module that includes instructions that enable the client to:
(i) retrieve a first entity record from the first plurality of entity records in the database such that the retrieved first entity record has a valid time period that includes a particular time, (ii) retrieve a second entity record from the second plurality of entity records in the database such that the retrieved second entity record has a valid time period that includes the particular time,
(iii) display a first data group view such that the first data group view includes data from the retrieved first entity record,
(iv) display a second data group view such that second data group view includes data from the retrieved second entity record,
(v) receive an input from a user to alter the particular time,
in response to receipt of the input:
(vi) retrieve a third entity record from the first plurality of entity records in the database such that the retrieved third entity record has a valid time period that includes the altered particular time,
(vii) retrieve a fourth entity record from the second plurality of entity records in the database such that the retrieved fourth entity record has a valid time period that includes the altered particular time,
(viii) alter the first data group view to display data from the retrieved third entity record, and
(iix) alter the second data group view to display data from the retrieved fourth entity record;
wherein the view management module enables the user to browse disparate entity data with the unified timeline.

* * * * *